United States Patent Office 3,823,046
Patented July 9, 1974

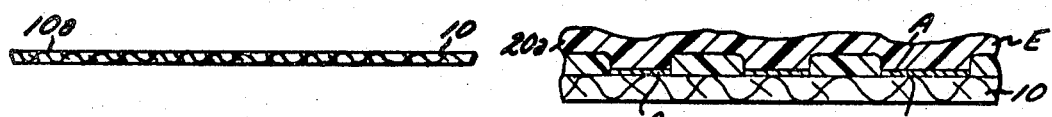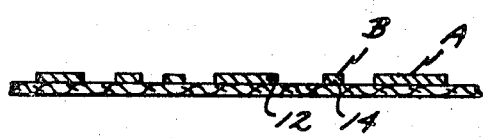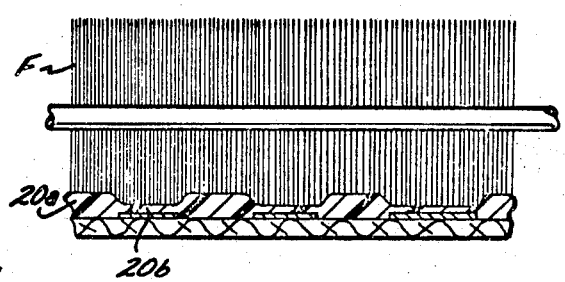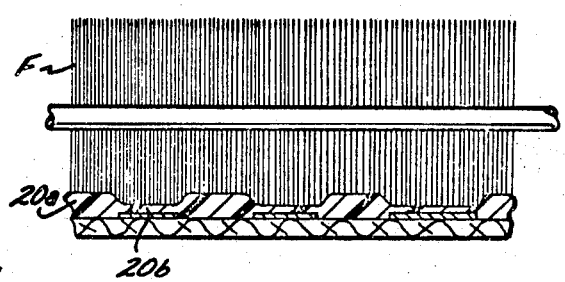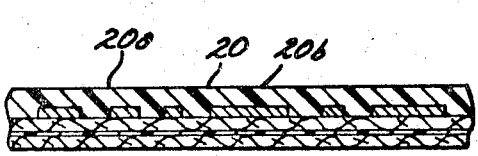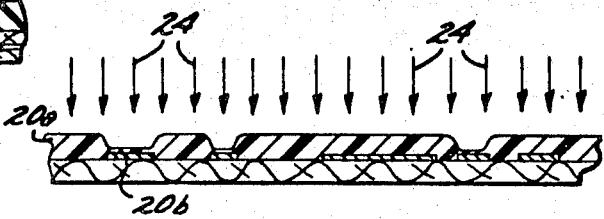

3,823,046
METHOD OF FORMING DECORATIVE SHEET
Iwao Yamagishi, Osaka, Japan, assignor to Eidai Sangyo Kabushiki Kaisha, Osaka, Japan
Continuation of abandoned application Ser. No. 65,082, Aug. 19, 1970. This application July 17, 1972, Ser. No. 272,207
Int. Cl. B32b 31/26
U.S. Cl. 156—220                                    4 Claims

ABSTRACT OF THE DISCLOSURE

A decorative sheet and a process for forming the same. The sheet includes a polymerized translucent or transparent resin layer that has a concave or convex second pattern defined on the exterior surface thereof that is accurately oriented and in precise registry relative to a first pattern that is visible through said layer.

CROSS-REFERENCES TO RELATED APPLICATIONS

The present application is a continuation of application Ser. No. 65,082, filed Aug. 19, 1970 in the name of Iwao Yamagishi, now abandoned.

U.S. Application No. 774,875, filed Nov. 12, 1968, now Pat. No. 3,554,872.

BACKGROUND OF THE INVENTION

Field of the Invention

A decorative sheet and method of forming the same.

Description of the Prior Art

In the past, decorative panels have been manufactured by a synthetic resin film or covering that is either translucent or transparent adhered to the surface of paper or the like on which a pattern is defined. From an operational standpoint, it is difficult to adhere the film uniformly to the paper, and the decorative sheet when so formed is not sufficiently pliable as to conform to uneven or curved surfaces to which it may be desired to apply the same.

In addition, the decorative sheet has a flat, smooth appearance, that does not enhance the decorative pattern that forms a part thereof. In an attempt to overcome the flat, smooth unattractive appearance of previously available decorative sheets of the type above described, concave relief patterns have been formed on the exterior surface of the polymerized resin by dies or rollers but has been found extremely difficult to cause such a relief pattern to accurately register and conform to a first pattern situated below the resin.

The primary purpose in devising the present invention is to supply a decorative sheet that has a concave or convex second pattern defined on the exterior surface of a film or layer of a transparent or translucent polymerized resin and the second pattern being accurately oriented and in precise registry relative to a first pattern that is visible through the layer.

SUMMARY OF THE INVENTION

A method of forming a decorative sheet in which paper or like material has a first pattern printed or otherwise defined thereon by a polymerization resin retarding ink, with the ink coated surface subsequently being coated with a layer of a polymerizable resin. The resin is of a type that contracts in volume on polymerization. As polymerization of the resin takes place, the portions thereof that overlie the uncoated surface of the paper polymerizes first and contract in volume, and in so doing draws liquid resin laterally that overlies the polymerization retarding ink defining pattern. As a result, the portions of the resin film overlying the polymerization retarding ink remain liquid, and portions of the same are drawn into the resin that polymerizes and solidifies first. Due to the differential in the rates at which the two resin portions polymerize, a concave or recessed pattern is formed on the exterior surface of the resin, and this recessed pattern being in accurate registry with the ink on the paper or backing member.

A major object of the present invention is to provide a decorative sheet and method of forming the same that will overcome the operational disadvantages of prior art methods used in the manufacture of such sheets.

Another object of the invention is to provide a method of forming a decorative sheet that is simple and easy to carry out, requires no auxiliary equipment such as presses, embossing dies or rollers, and one that permits the decorative panel to be produced by persons having little or no skill in this particular art.

A still further object of the invention is to supply a decorative panel that has an exterior surface on which a concave and convex second pattern is defined, with this second pattern being in accurate registry with a first pattern situated below the resin and visible therethrough, and the first pattern being defined by a first ink that has resin polymerization retarding qualities and a second ink that has no such qualities.

BRIEF DESCRIPTION OF THE DRAWING

FIG. 1 is a transverse cross sectional view of a sheet of material, such as paper or the like, prior to initiation of the decorative sheet forming operation;

FIG. 2 is a transverse cross sectional view of the sheet shown in FIG. 1 after a first pattern defined by a polymerization resin retarding ink has been printed thereon, and an additional pattern also printed on the sheet that has no such polymerization retarding qualities;

FIG. 3 is the same cross sectional view as shown in FIG. 2 but after a layer of adhesive has been applied to the sheet on the side opposite from that on which the inked patterns are defined;

FIG. 4 is the same cross sectional view as shown in FIG. 3 but after a second sheet has been bonded to the adhesive layer;

FIG. 5 is the same cross sectional view as shown in FIG. 4 but after a layer of polymerizable resin has been applied to the first sheet to overlie the inked patterns defined thereon;

FIG. 6 is the same cross sectional view as shown in FIG. 5, but after the resin has polymerized, with the portions of the resin overlying the polymerization retarding ink being of lesser thickness than the balance of the layer of resin, and a concave and convex pattern being defined on the exterior surface of the resin as a result thereof;

FIG. 7 is a transverse cross sectional view of a second form of decorative panel in which the unpolymerized liquid portion of the resin is removed from the sheet by means of a solvent;

FIG. 8 is a third form of decorative sheet in which the unpolymerized liquid resin is removed therefrom by a rotating brush to define the decorative panel that has concave and convex patterns formed on the exterior surface thereof;

FIG. 9 is a transverse cross sectional view of a decorative sheet in which the polymerization is accentuated by being exposed to ultraviolet rays; and FIG. 10 illustrates a second step in the forming of the panel as initially carried out in FIG. 9.

DESCRIPTION OF THE PREFERRED EMBODIMENTS

In FIG. 1 a sheet 10 of the paper or the like is shown, which sheet on a first surface 10a thereof has a polymerization resin retarding ink 12 applied thereto in a desired first pattern A. A second pattern B may be printed on the surface 10a by a second ink 14 that has no resin polymerization retarding qualities. The second pattern B is in a desired spaced relationship.

After the first and seconds inks 12 and 14 have been applied to the sheet 10, a layer 16 of adhesive is applied to the second surface 10b of sheet 10. The adhesive 16 serves to sheath the surface 10b with a material that is not permeable to the inks 12 and 14. The layer of adhesive 16 also permits a sheet 18 of paper or the like to be bonded thereto, with the adhesive now being sandwiched between the sheets 10 and 18, and holding the sheets in fixed relationship with one another. Both the sheets 10 and 18 are preferably quite thin, in order that the decorative sheet when completed will be pliable.

After the method has been continued to provide the assembly as above described and as shown in FIG. 4, a layer of a polymerized resin 20 is applied at a uniform depth to side 10a to envelop the inked patterns A and B defined thereon. The resin defining the layer 20 is one that contracts in volume upon polymerization. In FIG. 5 it will be seen that there are portions 20a of the resin 20 that overlie the inked pattern B, and are the first to polymerize. As polymerization of the portions 20a takes place, the portions contract in volume and in so doing draw resin portions 20b that are still in the liquid form and overlies the inked pattern A laterally to thin out these portions and form a recessed pattern C in the external surface of the layer of resin 20.

The decorative sheet formed as above described is characterized by the recessed pattern C on the exterior surface thereof, which recessed pattern is in direct and accurate registry with the first pattern A. The portions 20a of the layer of resin 20 are of maximum thickness, and envelop sections of the second pattern B as shown in FIG. 5. Thus, the portions 20a of the layer of resin 20 that are of maximum thickness define a convex pattern D on the exterior surface of the decorative panel. The polymerization resin retarding ink 12 preferably one that is pigmented and includes quinone compounds such as p-benzoquinone, chloroaniline, anthraquinone, hydroquinone, p-tertiary class butyl catechol or nitro compounds such as m-dinitrobenzene, 2,4-dinitrophenol, picric acid. Polypropylene and polyethylene vinyl acetate have been found satisfactory as a pliable adhesive to define the layer 16.

The sheet material 10 as well as the sheet material 18 may be formed from thin paper, kraft paper, cloth or the like. When the polymerizable resin is an unsaturated polyester, an accelerating agent may be used to hasten the polymerization thereof, which agent may be a material such as benzoyl peroxide, dimethyl aniline, methyl ethyl ketone and peroxide. It is desirable that the polymerizable resin selected to define the layer 20 be one that is flexible and pliable after the polymerization thereof.

In FIG. 7 a second form of the invention is shown in which the sheet 10 has a pattern A defined thereon by a resin polymerization retarding ink 12 and a layer of a polymerizable resin applied to the sheet to overlie the surface 10a thereof and form portions 20a as previously described. Prior to the resin overlying the inked pattern A solidifying, it is removed from the sheet by applying a solvent E to the sheet to dissolve this material. Also, as shown in FIG. 8, the surplus liquid and unpolymerized resin 20b can be removed between the solidified portions 20a by causing a rotating brush F to contact the same. Materials that have been found satisfactory for use as the solvent E are styrene, acetone, methyl ethyl ketone, and the like.

In the industrial production of decorative sheets by the method above defined, it has been found desirable to accelerate the polymerization of the resin portions 20a by exposure of the same to ultraviolet light rays 22 as shown in FIG. 9. After the polymerization of the portions 20a as shown in FIG. 9, and the forming of the recessed pattern C, the entire body of the resin 20 may be hardened by exposure to suitable rays 24 that are of a type that accelerates the polymerization of the resin.

The first sheet 10, adhesive layer 16, second sheet 18 and the layer of resin 20 when polymerized are all pliable to permit the decorative sheet to conform to an uneven or curved surface with which it is in contact. The layer 20 of polymerized resin remains in fixed relationship due to the resin bonding thereto when it polymerizes. The pigmented material that defines the first and second patterns A and B are of a color that is different from the sheet 10, to permit the first and second patterns to be visibly distinguishable from the sheet when viewed through the overlying layer of polymerized resin 20. The sheet 10 may be relatively thin, for even though the ink defining the patterns A and B migrates through the sheet, further migration of the ink is prevented by the impervious character of the layer 16 of adhesive. Thus, the possibility of the second sheet 18 being stained by the ink defining the patterns A and B is eliminated.

What is claimed is:

1. A process for making a decorative sheet that comprises the steps of :
    (a) printing a first pattern on a first surface of a first sheet with a pigmented polymerization resin retarding ink;
    (b) applying a layer of a transparent liquid polymerizable resin to said first surface to overlie the same;
    (c) subjecting said layer to a polymerizing agent that polymerizes and solidifies the same except as to those portions thereof overlying said pattern, and the portions of said layer overlying said patterns remaining liquid due to said polymerization resin retarding ink; and
    (d) removing the portions of said layer that remain liquid to obtain said decorative sheet.

2. A process as defined in claim 1 in which the step of removing the portions of said layer that remain liquid is contacting said layer with a liquid solvent that dissolves said liquid resin but does not dissolve said resin that has polymerized.

3. A process as defined in claim 1 in which the step of subjecting said layer to a polymerizing agent is subjecting said layer to radiation that polymerizes all of said layer to a solid state except those portions thereof that overlie said pattern that remain liquid due to the action of said polymerization resin retarding ink.

4. A process as defined in claim 1 in which the step of removing the portions of said layer that remain liquid is subjecting said portions to the action of a rotating brush to the extent that said liquid portions are removed from said sheet.

References Cited
UNITED STATES PATENTS 3,219,506    11/1965    Dusina et al. _____ 156—220
3,554,827    1/1971    Yamagishi _____ 156—220

WILLIAM A. POWELL, Primary Examiner

U.S. Cl. X.R.

156—3, 7, 85, 272; 161—2, 5, 6, 413